United States Patent
Li

(10) Patent No.: US 11,319,676 B2
(45) Date of Patent: May 3, 2022

(54) CONSTRUCTION METHOD FOR USING PHOSPHOGYPSUM IN EMBANKMENT IMPROVEMENT

(71) Applicant: INSTITUTE OF GEOLOGY AND GEOPHYSICS, CHINESE ACADEMY OF SCIENCES, Beijing (CN)

(72) Inventor: Zhiqing Li, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 345 days.

(21) Appl. No.: 16/786,041

(22) Filed: Feb. 10, 2020

(65) Prior Publication Data
US 2020/0263364 A1    Aug. 20, 2020

(30) Foreign Application Priority Data

Feb. 15, 2019   (CN) .......................... 201910117916.8

(51) Int. Cl.
*E01C 3/06* (2006.01)
*C04B 28/14* (2006.01)
(Continued)

(52) U.S. Cl.
CPC ................ *E01C 3/06* (2013.01); *C04B 28/14* (2013.01); *E01C 1/002* (2013.01); *E01C 3/003* (2013.01);
(Continued)

(58) Field of Classification Search
CPC . E01C 1/002; E01C 3/003; E01C 3/06; E01C 7/36; C04B 28/14; C04B 2111/0075
(Continued)

(56) References Cited

U.S. PATENT DOCUMENTS

| 4,448,566 | A | * | 5/1984 | King | ....................... E01C 3/003 427/136 |
| 6,042,305 | A | * | 3/2000 | Novich | ................... C09K 17/40 106/900 |

(Continued)

FOREIGN PATENT DOCUMENTS

AU    2021104707    * 7/2021 ............. C04B 28/14

*Primary Examiner* — Raymond W Addie
(74) *Attorney, Agent, or Firm* — Onello & Mello, LLP

(57) ABSTRACT

A construction and/or installation method for using phosphogypsum in embankment improvement includes preparing a phosphogypsum-containing embankment mixture, setting moisture content of an embankment mixture, paving a modified phosphogypsum-containing embankment, and reversely layering anti-seepage cushion layers from two sides of the embankment to the center of the embankment. The preparation of a phosphogypsum-containing embankment mixture can include the following: 90 parts by weight of phosphogypsum and 10 parts by weight of cement are weighted, uniformly mixed and stirred to obtain a base material mixture; and 2-4 parts by weight of sodium silicate is weighted and dissolved in water, and an obtained solution is added to the base material mixture to obtain the phosphogypsum-containing embankment mixture. The construction and/or installation method for using phosphogypsum in an embankment improvement can satisfy embankment strength and rebound modulus requirements, and can be widely applied to a filling-deficient area and an area with a relatively high yield of phosphogypsum solid wastes.

1 Claim, 1 Drawing Sheet

(51) Int. Cl.
*E01C 1/00* (2006.01)
*E01C 3/00* (2006.01)
C04B 111/00 (2006.01)
*E01C 7/36* (2006.01)

(52) U.S. Cl.
CPC ......... *C04B 2111/0075* (2013.01); *E01C 7/36* (2013.01)

(58) Field of Classification Search
USPC ....... 404/17–24, 28–31, 72–76, 82, 101–111
See application file for complete search history.

(56) References Cited

U.S. PATENT DOCUMENTS

| | | | | |
|---|---|---|---|---|
| 6,290,637 | B1* | 9/2001 | Eighmy | E02D 3/12 588/259 |
| 6,398,841 | B1* | 6/2002 | Sangwan | C05F 5/006 71/23 |
| 7,288,581 | B2* | 10/2007 | Ferrall | C09K 17/40 405/129.95 |
| 2006/0008325 | A1* | 1/2006 | Ianniello | B09B 1/00 405/129.1 |
| 2008/0069642 | A1* | 3/2008 | Ayers | B09B 1/004 405/129.45 |
| 2012/0020745 | A1* | 1/2012 | Miller | E02D 29/0241 405/284 |
| 2012/0216720 | A1* | 8/2012 | Deng | E02D 3/11 106/713 |

\* cited by examiner

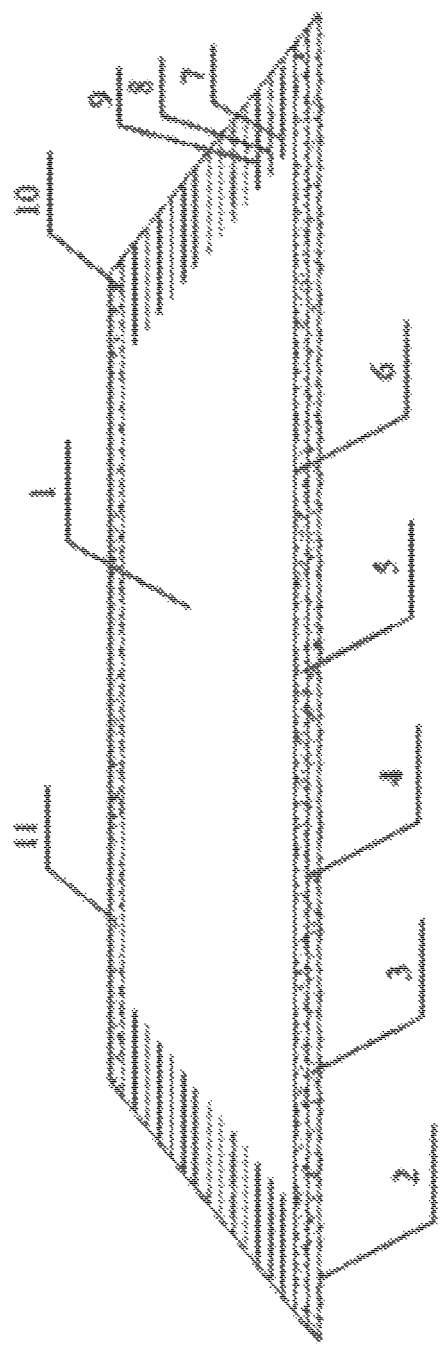

CONSTRUCTION METHOD FOR USING PHOSPHOGYPSUM IN EMBANKMENT IMPROVEMENT

CROSS REFERENCE TO RELATED APPLICATIONS

The present application claims the benefit of priority under 35 USC 119 to Chinese patent application 201910117916.8, filed Feb. 15, 2019, the contents of which are incorporated herein by reference.

TECHNICAL FIELD

The present invention relates to the road engineering field, and specifically to a construction method for using phosphogypsum in an embankment improvement.

BACKGROUND

Conventional embankments mainly include a rockfill embankment, a soil-filled embankment, and a rock-soil filled embankment, among which the rock-soil filled embankment is the most common embankment. The rock-soil filled embankment needs to be filled by soil and rocks acquired from a borrow pit. There is a relatively large difference in physical and mechanical properties of fillers in different sections because of complex geological conditions in a highway construction area. If multiple types of soil-rock mixtures with different physical and mechanical properties are laid on the same pavement layer of an embankment, it is difficult to compact and level the embankment. Therefore, differential settlement occurs extremely easily after construction, thereby resulting in destruction and deformation of a road surface.

Phosphogypsum is a by-product produced when a wet process is adopted to produce phosphoric acid in a chemical plant by allowing reaction between apatite and sulfuric acid. When 1 ton of phosphoric acid is produced, approximately 5 tons of phosphogypsum will be produced. Phosphogypsum is a powdery material with almost no plasticity. There are phosphoric acid, sulfuric acid, and hydrofluoric acid in the phosphogypsum. Therefore, the phosphogypsum is slightly acidic. More than 8 million tons of phosphogypsum are produced every year in China. By the end of 2011, more than 300 million tons of phosphogypsum in total has accumulated in China. If specific technical measures can be taken to apply phosphogypsum to embankment filling, phosphogypsum stockpiling will be greatly reduced. On one hand, land resources are saved, and geological disasters of a phosphogypsum dam can be avoided. On the other hand, a problem of highway embankment filling in a soil-deficient area can be resolved.

SUMMARY

An objective of the present invention is to provide a construction method for using phosphogypsum in an embankment improvement, which consumes a large amount of phosphogypsum. On one hand, the method can save land resources, and avoid geological disasters of a phosphogypsum dam. On the other hand, the method can resolve a problem of highway embankment filling in a soil-deficient area.

In accordance with aspects of the inventive concepts, provided is a method of making and installing an improved embankment using phosphogypsum. In various embodiments, there are a phosphogypsum-containing embankment mixture, a first anti-seepage cushion layer, a first soil filler layer, a second anti-seepage cushion layer, a second soil filler layer, a third anti-seepage cushion layer, a fourth anti-seepage cushion layer, a fifth anti-seepage cushion layer, a sixth anti-seepage cushion layer, an $n^{th}$ anti-seepage cushion layer, and a third soil filler layer.

A technical solution in in the form of an embodiment in accordance with aspects of the present invention comprises a construction and/or installation method for using phosphogypsum in an embankment improvement.

The method can include the following steps:
(1) preparing a phosphogypsum-containing embankment mixture including:
    weighing 90 parts by weight of phosphogypsum and 10 parts by weight of cement, and uniformly mixing and stirring the phosphogypsum and the cement to obtain a base material mixture; and
    weighing 2-4 parts by weight of sodium silicate, dissolving the sodium silicate in water, and adding an obtained solution to the base material mixture to obtain the phosphogypsum-containing embankment mixture;
(2) mixing the phosphogypsum-containing embankment mixture with water, including:
    acquiring a part of the phosphogypsum-containing embankment mixture by using an isostatic pressing method, adding water to prepare samples with different water content, and obtaining maximum dry density and optimal moisture content of the phosphogypsum-containing embankment mixture in a same compaction energy condition, where moisture content of the phosphogypsum-containing embankment mixture is defined as a mass percentage of water lost when heating is conducted at 120-130° C. for 9-12 hours (h), to result in a dried phosphogypsum-containing embankment mixture at the temperature;
(3) adding water to the phosphogypsum-containing embankment mixture according to the optimal moisture content obtained through the test, to make moisture content of the phosphogypsum-containing embankment mixture reach the optimal moisture content, to obtain a preferred embankment filler, where mixing of the phosphogypsum-containing embankment mixture is conducted in a plantmix manner by using a stock bin of a cement stabilized soil mixing station and a forced mixer, and
    where in various embodiments an anti-seepage cushion layer is an anti-seepage geotechnical cloth or an anti-seepage geomembrane with a thickness not less than 1.0 mm; and
(4) transporting the embankment filler to a construction and/or installation site.

Once transported to a specific construction or installation site, an-site construction or installation method can include:
1) leveling and compacting original ground, and layering a soil filler above a groundwater level and a surface water level, where a loose layering depth of each layer of laid soil filler is not greater than 40 cm, and compactness is not less than 90%;
2) layering a first anti-seepage cushion layer on a full section of a top surface of a compacted soil-filled embankment;
3) layering a first soil filler layer on a full section of the first anti-seepage cushion layer, where a loose layering depth of the first soil filler layer is not greater than 40 cm; conducting compaction and densification on the first soil filler layer in a condition of optimal moisture content; and layering a second anti-seepage cushion layer on a full section of the top surface of the first soil filler layer;

4) layering a second soil filler layer on a full section of the second anti-seepage cushion layer, where a loose layering depth of the second soil filler layer is not greater than 40 cm; conducting compaction and densification on the second soil filler layer in a condition of optimal moisture content; and layering a third anti-seepage cushion layer on a full section of the top surface of the second soil filler layer;

5) layering the phosphogypsum-containing embankment mixture on a full section of the top surface of the third anti-seepage cushion layer, where a loose layering depth of the phosphogypsum-containing embankment mixture is not greater than 40 cm; conducting isostatic compaction and densification in a condition of optimal moisture content; reversely layering the third anti-seepage cushion layer from two sides of the embankment to the center of the embankment, where a layering width of the third anti-seepage cushion layer on each side along an embankment section direction is not less than 1.5 m; and layering a fourth anti-seepage cushion layer with a same width as the third anti-seepage cushion layer on the third anti-seepage cushion layer;

6) layering the phosphogypsum-containing embankment mixture on the top surface of the phosphogypsum-containing embankment, where a loose layering depth of the phosphogypsum-containing embankment mixture 1 is not greater than 40 cm; conducting isostatic compaction and densification in a condition of optimal moisture content; reversely layering the fourth anti-seepage cushion layer from two sides of the embankment to the center of the embankment, where a layering width of the fourth anti-seepage cushion layer on each side along the embankment section direction is not less than 1.5 m; and layering a fifth anti-seepage cushion layer with a same width as the fourth anti-seepage cushion layer on the fourth anti-seepage cushion layer;

7) layering the phosphogypsum-containing embankment mixture on the top surface of the phosphogypsum-containing embankment, where a loose layering depth of the phosphogypsum-containing embankment mixture is not greater than 40 cm; conducting isostatic compaction and densification in a condition of optimal moisture content; reversely layering the fifth anti-seepage cushion layer from two sides of the embankment to the center of the embankment, where a layering width of the fifth anti-seepage cushion layer on each side along the embankment section direction is not less than 1.5 m; and layering a sixth anti-seepage cushion layer with a same width as the fifth anti-seepage cushion layer on the fifth anti-seepage cushion layer;

8) continuously layering the phosphogypsum-containing embankment mixture according to the above method until reaching an upper embankment, where a loose layering depth of each layer of phosphogypsum-containing embankment mixture is not greater than 40 cm; conducting isostatic compaction and densification in a condition of optimal moisture content; and reversely layering an $n^{th}$ anti-seepage cushion layer on a full section of the embankment from its two sides to its center; and 9) layering a third soil filler layer on a full section of the $n^{th}$ anti-seepage cushion layer, where a loose layering depth of the third soil filler layer is not greater than 40 cm; and conducting compaction and densification on the third soil filler layer in a condition of optimal moisture content, so as to form a filling embankment.

The present invention can provide many advantages. The construction and/or installation method for using phosphogypsum in embankment improvement is simple, can satisfy embankment strength and rebound modulus requirements, and can be widely applied to a filling-deficient area and an area with a relatively high yield of phosphogypsum solid wastes. In addition, this method can reduce occupation of phosphogypsum in cultivated lands, reduce the damage of phosphogypsum to the environment, and turn wastes into treasures. Moreover, the phosphogypsum can satisfy use requirements of embankment fillings.

The present invention is applicable to embankment filling in road engineering, and in particular, to a filling-deficient road and a phosphogypsum-rich area, as examples.

BRIEF DESCRIPTION OF THE DRAWINGS

The inventive concepts will become more apparent in view of the attached drawing and accompanying detailed description. The embodiments depicted therein are provided by way of example, not by way of limitation, wherein like reference numerals refer to the same or similar elements. The drawing is not necessarily to scale, emphasis instead being placed upon illustrating aspects of the invention. In the drawings:

FIG. 1 is a schematic diagram of an embodiment of a construction method for using phosphogypsum to form an improved embankment, in accordance with aspects of the inventive concepts.

In the figure, there are a phosphogypsum-containing embankment mixture 1, a first anti-seepage cushion layer 2, a first soil filler layer 3, a second anti-seepage cushion layer 4, a second soil filler layer 5, a third anti-seepage cushion layer 6, a fourth anti-seepage cushion layer 7, a fifth anti-seepage cushion layer 8, a sixth anti-seepage cushion layer 9, an $n^{th}$ anti-seepage cushion layer 10, and a third soil filler layer 11.

DETAILED DESCRIPTION

In an embodiment, a construction method for using phosphogypsum in embankment improvement is provided. Referring to FIG. 1, the method can include the following steps:

(1) preparing a phosphogypsum-containing embankment mixture, including:
  weighing 90 tons of phosphogypsum and 10 tons of cement, and uniformly mixing and stirring the phosphogypsum and the cement to obtain a base material mixture; and weighing 2 tons of sodium silicate, dissolving the sodium silicate in water, and adding an obtained solution to the base material mixture to obtain the phosphogypsum-containing embankment mixture;

(2) mixing the phosphogypsum-containing embankment mixture with water, including:
  acquiring a part of the phosphogypsum-containing embankment mixture by using an isostatic pressing method, adding water to prepare samples with different water content, and obtaining maximum dry density and optimal moisture content of the phosphogypsum-containing embankment mixture in a same compaction energy condition;

(3) adding water to the phosphogypsum-containing embankment mixture according to the optimal moisture content obtained through the test, to make moisture content of the phosphogypsum-containing embankment mixture 1 reach the optimal moisture content, to obtain a preferred embankment filler, where mixing of the phosphogypsum-containing embankment mixture is conducted in a plantmix manner by using a stock bin of a cement stabilized soil mixing station and a forced mixer; and an anti-seepage cushion layer is an anti-seepage geotechnical cloth or an anti-seepage geomembrane with a thickness not less than 1.0 mm; and (4) transporting the embankment filler to a construction or installation site.

In accordance with aspects of the inventive concepts, once the embankment filler is transported to the construction or installation site, e.g., as in step (4) above, a specific embodiment of a construction or installation method includes:

1) leveling and compacting original ground, and layering a soil filler above a groundwater level and a surface water level, where a loose layering depth of each layer of laid soil filler is 40 cm, and compactness is 90%;
2) layering a first anti-seepage cushion layer on a full section of a top surface of a compacted soil-filled embankment;
3) layering a first soil filler layer on a full section of the first anti-seepage cushion layer, where a loose layering depth of the first soil filler layer is 40 cm; conducting compaction and densification on the first soil filler layer in a condition of optimal moisture content; and layering a second anti-seepage cushion layer on a full section of the top surface of the first soil filler layer;
4) layering a second soil filler layer on a full section of the second anti-seepage cushion layer, where a loose layering depth of the second soil filler layer is 40 cm; conducting compaction and densification on the second soil filler layer in a condition of optimal moisture content; and layering a third anti-seepage cushion layer on a full section of the top surface of the second soil filler layer;
5) layering the phosphogypsum-containing embankment mixture on a full section of the top surface of the third anti-seepage cushion layer, where a loose layering depth of the phosphogypsum-containing embankment mixture is 40 cm; conducting isostatic compaction and densification in a condition of optimal moisture content; reversely layering the third anti-seepage cushion layer from two sides of the embankment to the center of the embankment, where a layering width of the third anti-seepage cushion layer on each side along an embankment section direction is 2.0 m; and layering a fourth anti-seepage cushion layer with a same width as the third anti-seepage cushion layer on the third anti-seepage cushion layer;
6) layering the phosphogypsum-containing embankment mixture on the top surface of the phosphogypsum-containing embankment, where a loose layering depth of the phosphogypsum-containing embankment mixture is 40 cm; conducting isostatic compaction and densification in a condition of optimal moisture content; reversely layering the fourth anti-seepage cushion layer from two sides of the embankment to the center of the embankment, where a layering width of the fourth anti-seepage cushion layer on each side along the embankment section direction is 2.0 m; and layering a fifth anti-seepage cushion layer with a same width as the fourth anti-seepage cushion layer on the fourth anti-seepage cushion layer;
7) layering the phosphogypsum-containing embankment mixture on the top surface of the phosphogypsum-containing embankment, where a loose layering depth of the phosphogypsum-containing embankment mixture is 40 cm; conducting isostatic compaction and densification in a condition of optimal moisture content; reversely layering the fifth anti-seepage cushion layer from two sides of the embankment to the center of the embankment, where a layering width of the fifth anti-seepage cushion layer on each side along the embankment section direction is 2.0 m; and layering a sixth anti-seepage cushion layer with a same width as the fifth anti-seepage cushion layer on the fifth anti-seepage cushion layer;
8) continuously layering the phosphogypsum-containing embankment mixture according to the above method until reaching an upper embankment, where a loose layering depth of each layer of phosphogypsum-containing embankment mixture is 40 cm; conducting isostatic compaction and densification in a condition of optimal moisture content; and reversely layering an $n^{th}$ anti-seepage cushion layer on a full section of the embankment from its two sides to its center; and
9) layering a third soil filler layer on a full section of the $n^{th}$ anti-seepage cushion layer, where a loose layering depth of the third soil filler layer is 40 cm; and conducting compaction and densification on the third soil filler layer in a condition of optimal moisture content, so as to form a filling embankment.

Specific embodiments described in this specification are intended to be illustrative of the principles and implementations of the present invention. The description of the aforementioned embodiments is only used for facilitating understanding of the method and the core ideas associated with the present invention. Those of general technical knowledge in the field, will appreciate that changes in specific implementations and application will still fall within the scope of the present invention. In conclusion, the scope of the present invention shall be defined by the claims, the construction of which shall not be unduly limited by the contents of this specification or the embodiments described herein.

What is claimed is:

1. A construction method for using phosphogypsum in an embankment, comprising:
   (1) preparing a phosphogypsum-containing embankment mixture, including:
      weighing 90 parts by weight of phosphogypsum and 10 parts by weight of cement, and uniformly mixing and stirring the phosphogypsum and the cement to obtain a base material mixture; and
      weighing 2-4 parts by weight of sodium silicate, dissolving the sodium silicate in water, and adding an obtained solution to the base material mixture to obtain the phosphogypsum-containing embankment mixture;
   (2) mixing the phosphogypsum-containing embankment mixture with water, including:
      acquiring a part of the phosphogypsum-containing embankment mixture by using an isostatic pressing method, adding water to prepare samples with different water content, and obtaining maximum dry density and optimal moisture content of the phosphogypsum-containing embankment mixture in a same compaction energy condition, wherein moisture content of the phosphogypsum-containing embankment mixture is defined as a mass percentage of water lost when heating is conducted at a temperature between 120-130° C. for 9-12 hours to form a dried phosphogypsum-containing embankment mixture at the temperature;
(3) adding water to the phosphogypsum-containing embankment mixture according to the optimal moisture content obtained in (2) above to make moisture content of the phosphogypsum-containing embankment mixture reach the optimal moisture content, to obtain an embankment filler, where mixing of the phosphogypsum-containing embankment mixture is conducted in a plantmix manner by using a stock bin of a cement stabilized soil mixing station and a forced mixer; and
where an anti-seepage cushion layer is an anti-seepage geotechnical cloth or an anti-seepage geomembrane with a thickness not less than 1.0 mm; and
(4) transporting the embankment filler to a construction site, and installing the embankment filler according to a method that includes:
1) leveling and compacting original ground, and layering a soil filler above a groundwater level and a surface water level, wherein a loose layering depth of each layer of laid soil filler is not greater than 40 cm, and compactness is not less than 90%;
2) layering a first anti-seepage cushion layer on a full section of a top surface of a compacted soil-filled embankment;
3) layering a first soil filler layer on a full section of the first anti-seepage cushion layer, wherein a loose layering depth of the first soil filler layer is not greater than 40 cm;
conducting compaction and densification on the first soil filler layer in a condition of optimal moisture content; and
layering a second anti-seepage cushion layer on a full section of the top surface of the first soil filler layer;
4) layering a second soil filler layer on a full section of the second anti-seepage cushion layer, wherein a loose layering depth of the second soil filler layer is not greater than 40 cm;
conducting compaction and densification on the second soil filler layer in a condition of optimal moisture content; and
layering a third anti-seepage cushion layer on a full section of the top surface of the second soil filler layer;
5) layering the phosphogypsum-containing embankment mixture on a full section of the top surface of the third anti-seepage cushion layer, wherein a loose layering depth of the phosphogypsum-containing embankment mixture is not greater than 40 cm;
conducting isostatic compaction and densification in a condition of optimal moisture content; reversely layering the third anti-seepage cushion layer from two sides of the embankment to the center of the embankment, wherein a layering width of the third anti-seepage cushion layer on each side along an embankment section direction is not less than 1.5 m; and layering a fourth anti-seepage cushion layer with a same width as the third anti-seepage cushion layer on the third anti-seepage cushion layer;
6) layering the phosphogypsum-containing embankment mixture on the top surface of the phosphogypsum-containing embankment, wherein a loose layering depth of the phosphogypsum-containing embankment mixture is not greater than 40 cm;
conducting isostatic compaction and densification in a condition of optimal moisture content;
reversely layering the fourth anti-seepage cushion layer from two sides of the embankment to the center of the embankment, wherein a layering width of the fourth anti-seepage cushion layer on each side along the embankment section direction is not less than 1.5 m; and
layering a fifth anti-seepage cushion layer with a same width as the fourth anti-seepage cushion layer on the fourth anti-seepage cushion layer;
7) layering the phosphogypsum-containing embankment mixture on the top surface of the phosphogypsum-containing embankment, wherein a loose layering depth of the phosphogypsum-containing embankment mixture is not greater than 40 cm;
conducting isostatic compaction and densification in a condition of optimal moisture content;
reversely layering the fifth anti-seepage cushion layer from two sides of the embankment to the center of the embankment, wherein a layering width of the fifth anti-seepage cushion layer on each side along the embankment section direction is not less than 1.5 m; and
layering a sixth anti-seepage cushion layer with a same width as the fifth anti-seepage cushion layer on the fifth anti-seepage cushion layer;
8) continuously layering the phosphogypsum-containing embankment mixture according to the above method until reaching an upper embankment, wherein a loose layering depth of each layer of phosphogypsum-containing embankment mixture is not greater than 40 cm;
conducting isostatic compaction and densification in a condition of optimal moisture content; and
reversely layering an $n^{th}$ anti-seepage cushion layer on a full section of the embankment from its two sides to its center; and
9) layering a third soil filler layer on a full section of the $n^{th}$ anti-seepage cushion layer, wherein a loose layering depth of the third soil filler layer is not greater than 40 cm; and
conducting compaction and densification on the third soil filler layer in a condition of optimal moisture content, so as to form a filling embankment.

* * * * *